United States Patent [19]
Adee et al.

[11] 3,732,672
[45] May 15, 1973

[54] STACK FORMING LOADER

[75] Inventors: Raymond A. Adee, Newton; Dean P. Brooks, Hesston; John Dale Anderson, Canton, all of Kans.

[73] Assignee: Hesston Corporation, Hesston, Kans.

[22] Filed: Oct. 22, 1970

[21] Appl. No.: 82,900

[52] U.S. Cl. ........................ 56/13.3, 56/344, 56/294
[51] Int. Cl. .............................................. A01d 87/10
[58] Field of Search ...................... 56/344, 294, 501, 56/504, 289, 13.3, 12.7

[56] References Cited

UNITED STATES PATENTS

| | | | |
|---|---|---|---|
| 3,190,064 | 6/1965 | Wenzel et al. | 56/294 |
| 2,902,813 | 9/1959 | Brady | 56/294 |
| 3,159,958 | 12/1964 | Mathews | 56/501 |
| 2,938,326 | 5/1960 | Lundell | 56/504 |
| 3,043,078 | 7/1962 | Witt et al. | 56/289 |

FOREIGN PATENTS OR APPLICATIONS

| | | | |
|---|---|---|---|
| 899,934 | 6/1962 | Great Britain | 56/12.7 |
| 267,220 | 5/1963 | Australia | 56/12.7 |

*Primary Examiner*—Antonio F. Guida
*Attorney*—Schmidt, Johnson, Hovey and Williams

[57] ABSTRACT

A stacking implement picks the precut crop off the ground, elevates the crop and blows it into a wagon. The crop is periodically compressed in the wagon, a crop-distributing deflector in the wagon is tilted in response to actuation of the compressor, and a stack unloading ramp is also raised and lowered by actuating the compressor.

4 Claims, 22 Drawing Figures

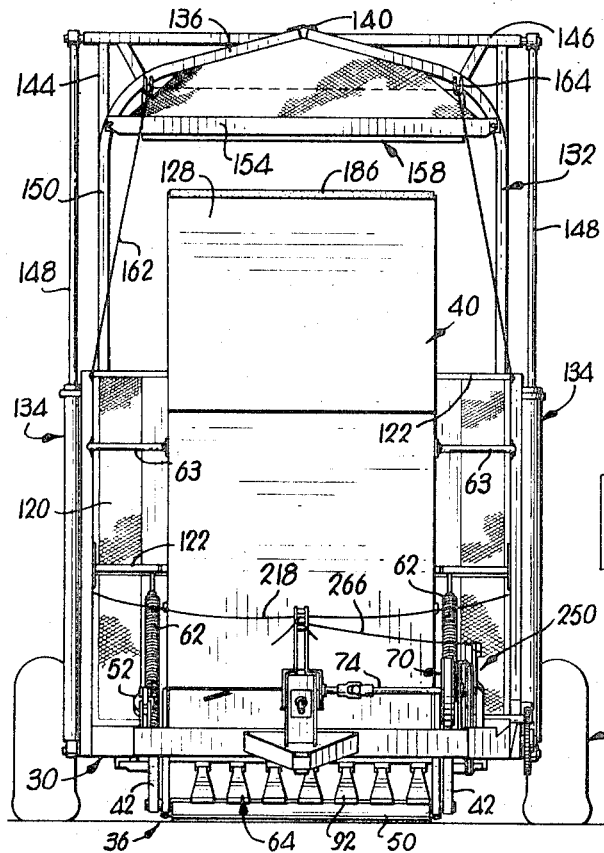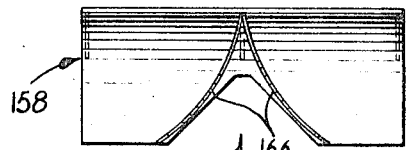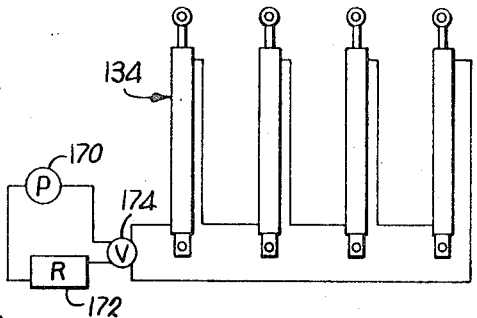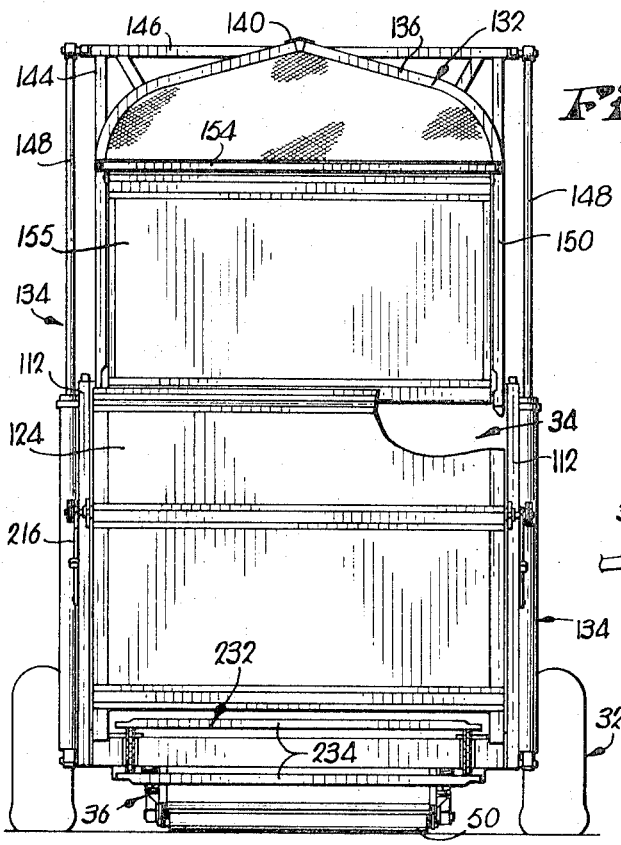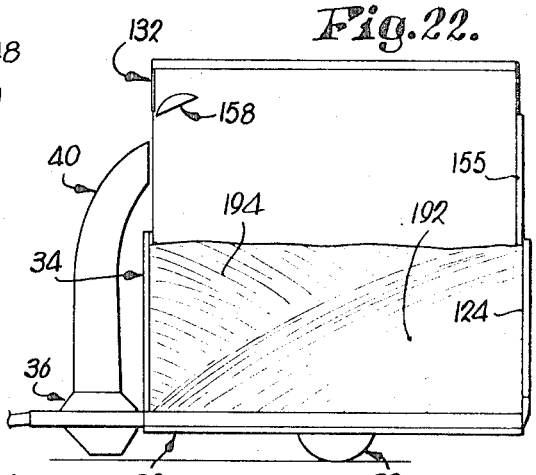

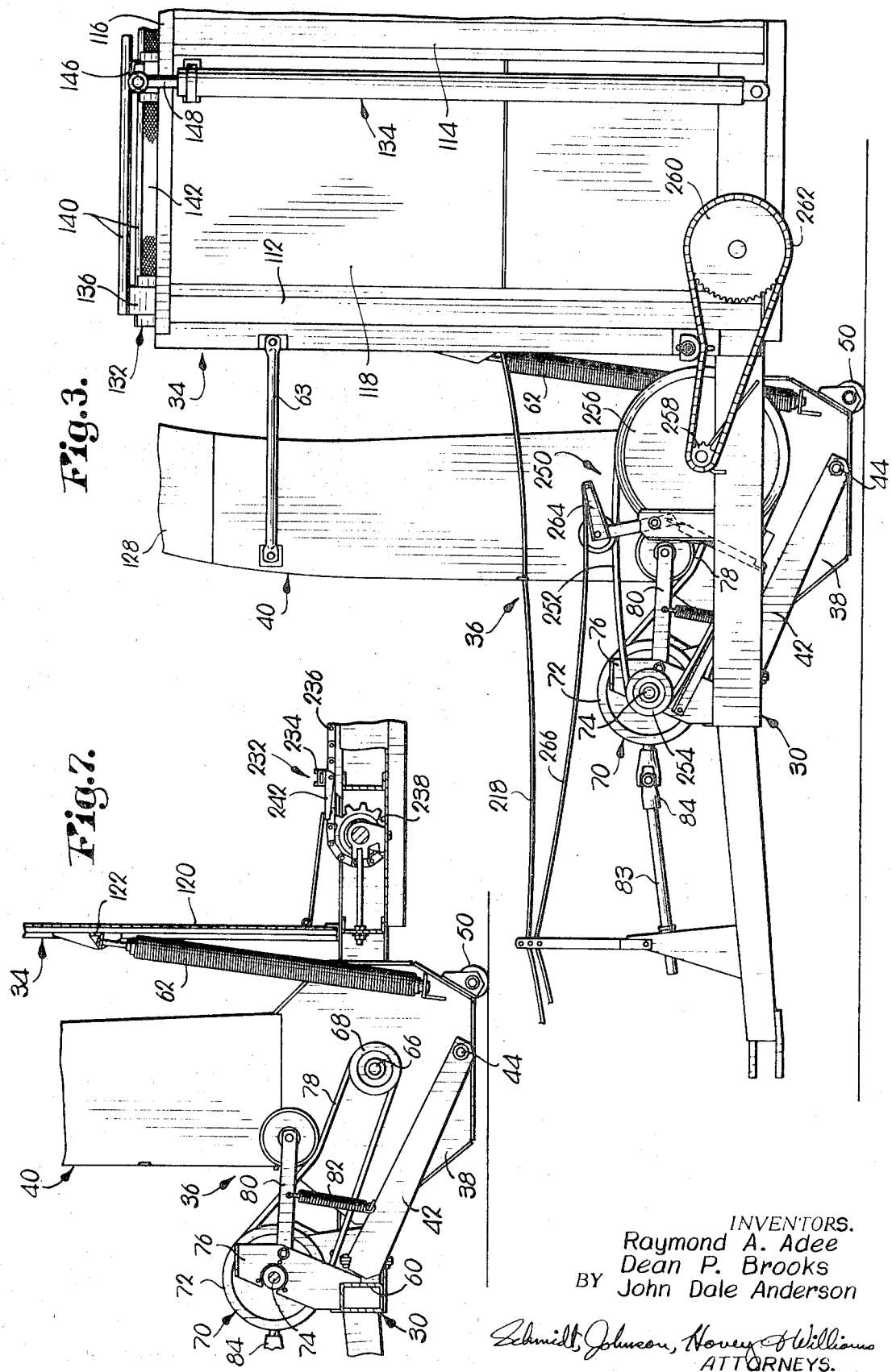

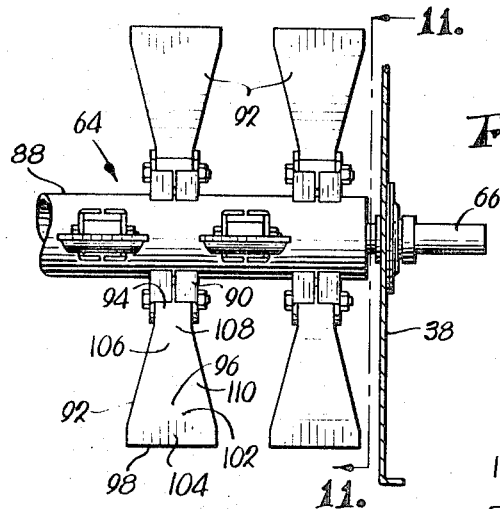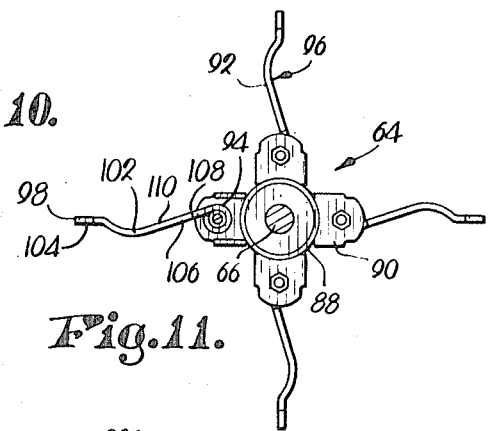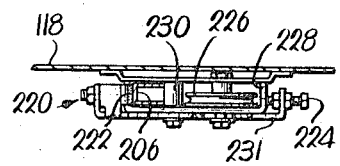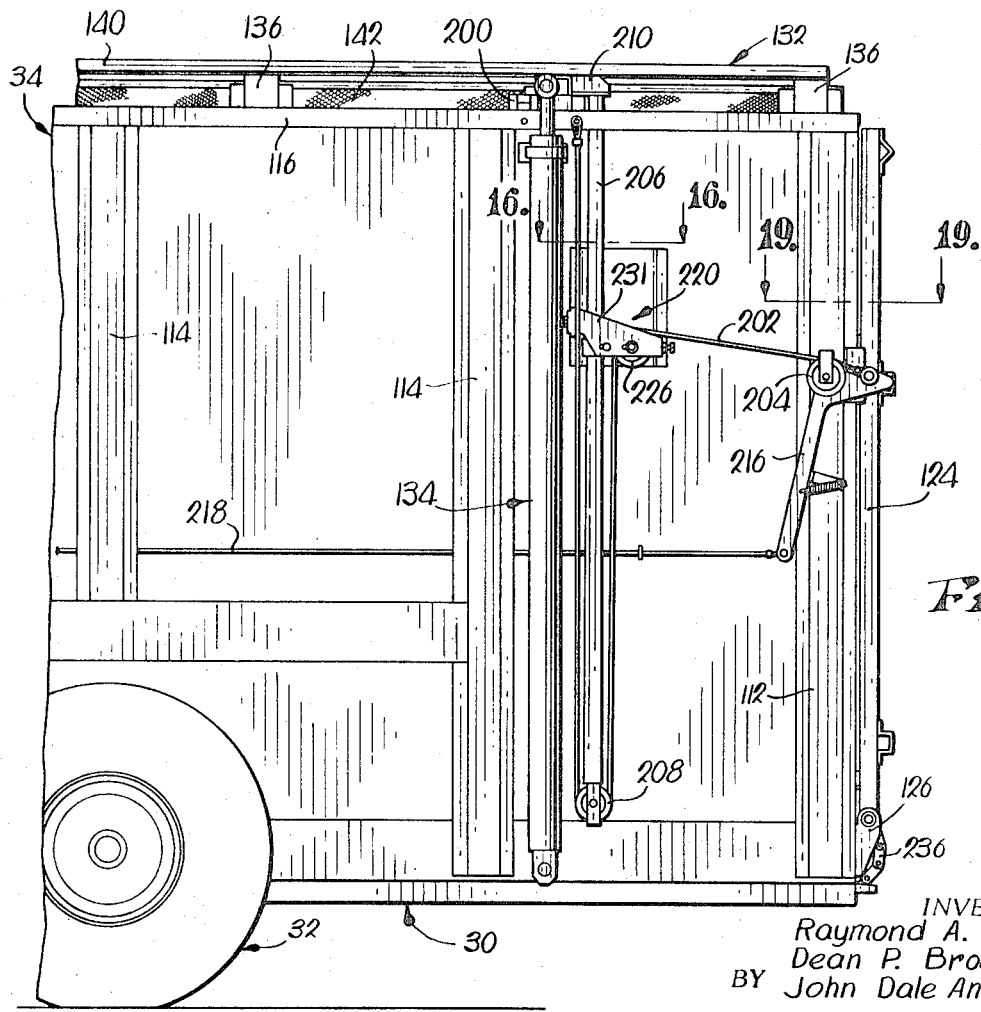

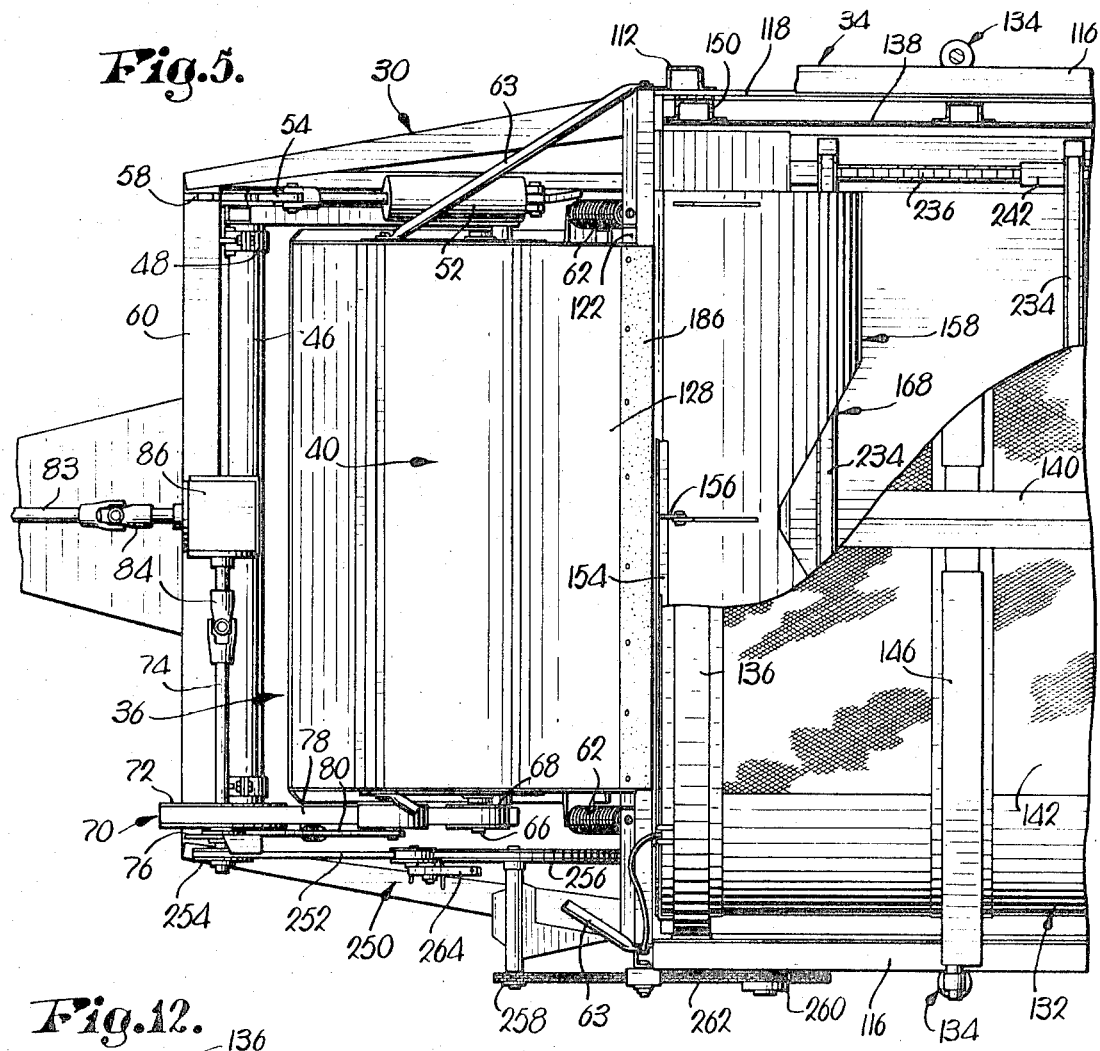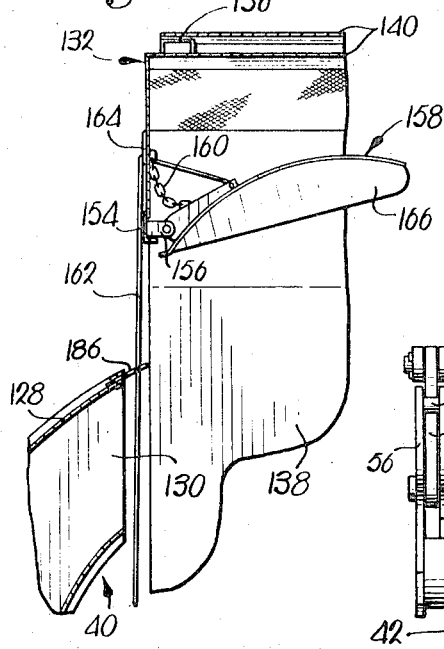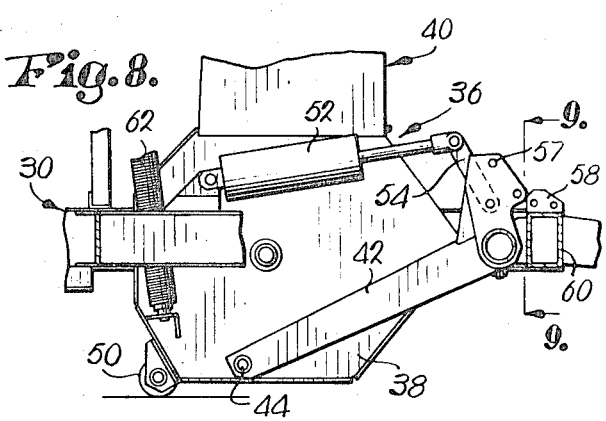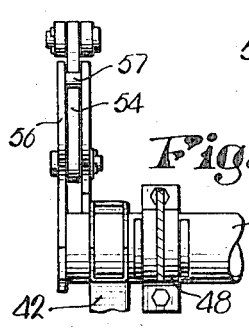

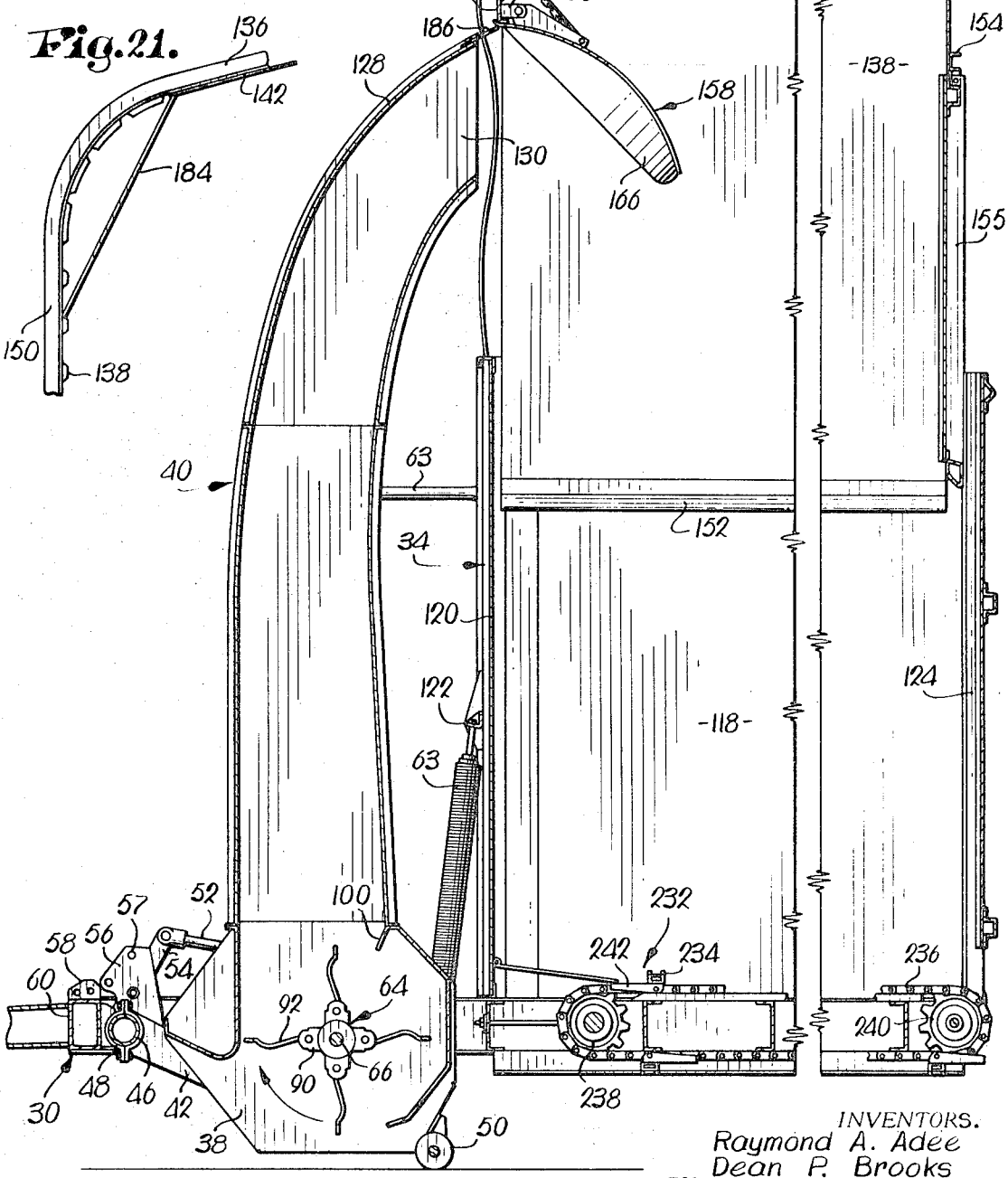

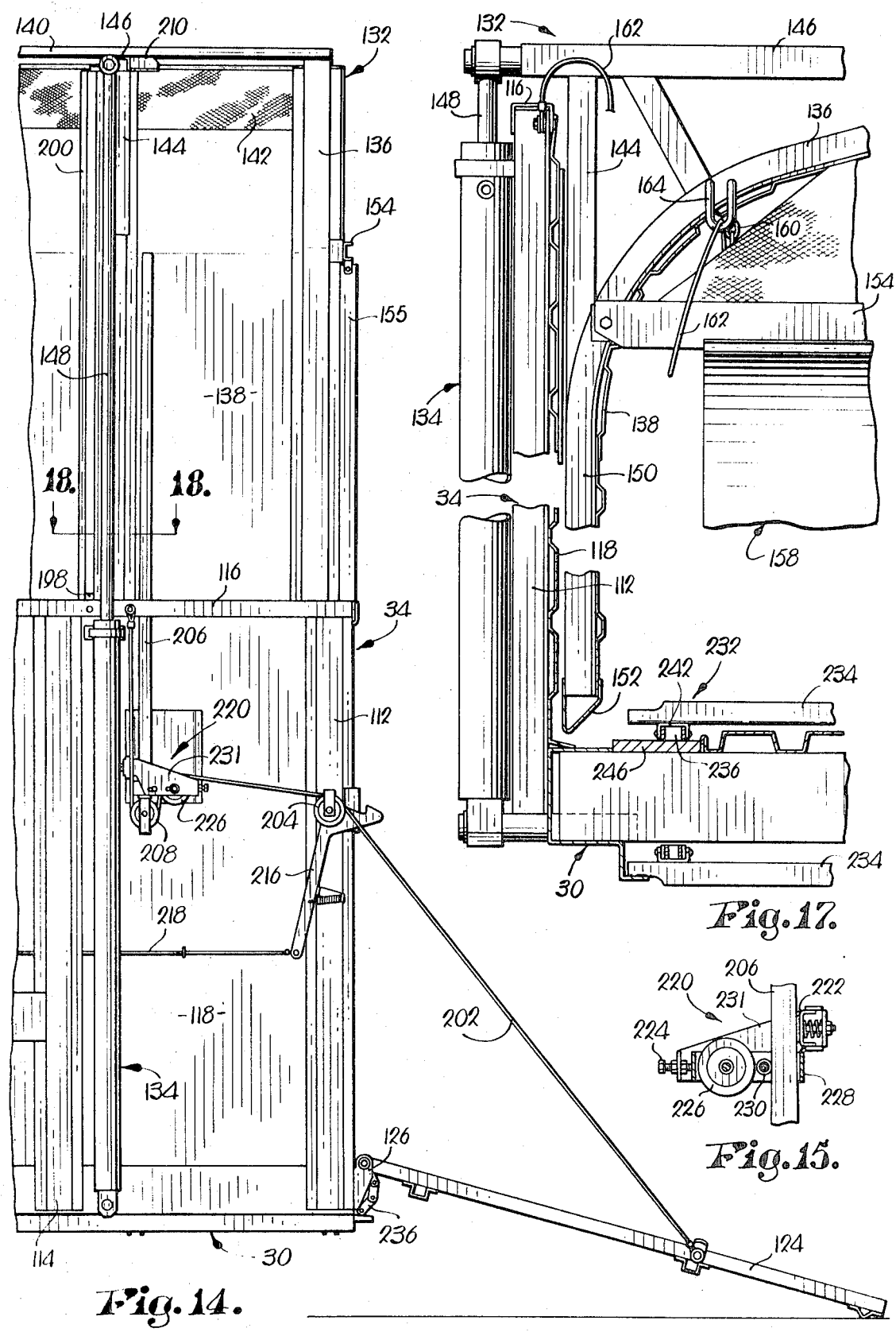

STACK FORMING LOADER

A primary object of our present invention is to provide a harvesting implement predicated upon the principle of forming a stack in a wagon as the crop is picked up from the field and having mechanism for lifting and conveying the crop to the wagon which is improved from the standpoint of efficient, rapid and trouble-free operation as well as inexpensive manufacture.

An important object of the present invention is to provide a simplified farm implement which greatly streamlines the process of lifting a severed crop from a field and producing a compact stack of the crop without a corresponding increase in damage to the crop or a decrease in the quality of the stack so formed.

Still another important object of the instant invention is the provision of an unusually simple deflector means for distributing the crop evenly within the wagon as the crop is fed thereinto.

A further object of the present invention is to provide a compressor which will produce a compact stack in the wagon and which is operable to form the stack into a proper shape with substantially uniform density throughout the stack.

Another important object of the instant invention is to provide, by means of a shiftable crop-distributing deflector within the container, for even distribution of the crop within the container, both fore-and-aft and laterally thereof, without the need for shifting the pickup and conveying unit relative to the container.

Yet another important object of the invention is the provision of a swingable ramp on the container which eliminates the need for tipping of the latter in order to unload the stack.

A still further important object of this invention is to take advantage of the reciprocating action of the compressor which periodically compacts the crop by linking the compressor to the deflector and to the ramp for adjustably tilting the deflector or raising and lowering the ramp in response to actuation of the compressor.

In the drawings:

FIG. 1 is a front elevational view of a stack forming loader constructed in accordance with the principles of the present invention;

FIG. 2 is a rear elevational view thereof;

FIG. 3 is an enlarged, fragmentary, elevational view of one front corner of the loader illustrating the drive assemblies for the pickup rotor and unloading mechanism, the compressor being shown in its lowered position;

FIG. 4 is an enlarged, fragmentary, elevational view of one rear corner of the loader illustrating the braking assembly for the ramp, the compressor again being shown in its lowered position;

FIG. 5 is an enlarged, fragmentary, top plan view of the front end of the loader, the compressor being partially broken away to reveal the crop deflector within the crop container of the loader;

FIG. 6 is an enlarged, fragmentary, vertical cross-sectional view taken along the longitudinal axis of the loader, the compressor being illustrated in a partially raised position;

FIG. 7 is an enlarged, fragmentary, elevational view similar to FIG. 3 with the drive assembly for the unloader mechanism being removed to clearly illustrate the rotor drive assembly, parts of the loader being illustrated in cross section for clarity;

FIG. 8 is an enlarged, fragmentary, detailed view illustrating the support and lifting apparatus for the pickup and conveying unit;

FIG. 9 is a vertical cross-sectional view taken along line 9—9 of FIG. 8;

FIG. 10 is an enlarged, fragmentary, detailed view of the rotor of the pickup and conveying unit;

FIG. 11 is a cross-sectional view of the rotor taken along line 11—11 of FIG. 10;

FIG. 12 is an enlarged, fragmentary, vertical cross-sectional view of the front upper corner of the loader with the compressor in its completely raised position;

FIG. 13 is an enlarged view of the crop deflector illustrating its concave inner surface;

FIG. 14 is an enlarged, fragmentary, elevational view of a rear corner of the loader with the compressor in its completely raised position and the ramp lowered to the ground;

FIG. 15 is an enlarged, fragmentary, detailed view of the braking assembly for the ramp shown partially in cross-section and viewed from the backside of the assembly;

FIG. 16 is a horizontal cross-sectional view of the braking assembly taken along line 16—16 of FIG. 4;

FIG. 17 is an enlarged, fragmentary, elevational view of the front of the loader, parts being broken away and shown in cross section to reveal details of construction;

FIG. 18 is an enlarged, fragmentary, horizontal cross-sectional view taken along line 18—18 of FIG. 14;

FIG. 19 is an enlarged, fragmentary, horizontal cross-sectional view taken along line 19—19 of FIG. 4;

FIG. 20 is a flow diagram illustrating the hydraulic system for moving the compressor;

FIG. 21 is a fragmentary, front elevational view of an upper corner of the compressor showing a modification thereof; and FIG. 22 is a diagrammatic view of the loader on a reduced scale illustrating the manner in which a crop is layered into the container for formation of a stack.

The loader of the present invention has a frame 30 (FIGS. 3 and 4) which is mounted for towing across a field by means of a wheel and axle assembly 32, and has a crop-receiving container broadly denoted by the numeral 34 for collecting a crop, such as hay, therewithin as the hay is fed into container 34 during advancement of the loader across a field. Frame 30 has a generally rectangular open area (FIGS. 3, 5 and 6) forward of container 34 which receives therewithin a combination pickup and conveying unit 36 for lifting the hay off the ground and delivering the same to the container 34 with a minimum of handling and damage to the hay.

The unit 36 includes an open bottom housing 38 having an open top at which an upright delivery tube 40 is attached in communication with the interior of housing 38. Housing 38 is supported within the open area of frame 30 by a pair of elongated arms 42 (FIGS. 6, 7 and 8) which are pivoted at 44 to housing 38 and have a common cross pipe 46 rigid thereto, two pairs of semi-circular clamps 48 being rigid to the frame 30 and loosely surrounding the pipe 46 for rotation of the latter about a horizontal axis. A roller 50 at the rear of housing 38 engages the ground when unit 36 is lowered, and a piston and cylinder assembly 52 may be used for raising unit 36 for over-the-road travel. Assembly 52 is pivoted at one end to frame 30 and at the opposite end to a link 54 (FIGS. 5, 8 and 9) which is, in turn, pivoted to a crank 56 rigid to one of the arms 42 and pipe 46.

The pivotal connection between link 54 and crank 56 permits the unit 36 to rise and fall over uneven terrain without working against the action of cylinder 52, while a short cross pin 57 (FIGS. 8 and 9) between the two plates which comprise the crank 56 limits the free movement of link 54 in one direction relative to crank 56 to cause raising of unit 36 when cylinder 52 moves link 54 against the pin 57.

A lug 58 on a crossbeam 60 of frame 30 is provided with a series of holes which match with corresponding holes in crank 56 when the unit 36 is raised for over-the-road travel, whereby a suitable locking pin (not shown) may be inserted through the respective holes to retain unit 36 in its raised condition. Floatation springs 62 interconnecting the container 34 and housing 38 serve to cushion the unit 36 and aid the piston and cylinder assembly 52 when unit 36 is raised from the ground, while elongated braces 63 (FIGS. 3 and 5) pivotally interconnect the tube 40 and container 34 to support tube 40 during raising and lowering of unit 36.

Unit 36 has a rotor 64 (FIG. 6) mounted on a cross shaft 66 journaled by housing 38 for rotation in a direction indicated by the arrow about an axis transverse to the path of travel of the loader. Shaft 66 extends outwardly beyond one side of housing 38 (FIGS. 7 and 8) and carries a sheave 68 which is part of the drive assembly 70 for the rotor 64, assembly 70 further including a large sheave 72 mounted for rotation with a cross shaft 74 supported by an upstanding brace 76 on beam 60. A belt 78 is entrained about sheaves 72 and 68, and a tensioning device 80 bears against belt 78 through the action of a coil spring 82 which interconnects device 80 and one of the arms 42. The cross shaft 74 is operably coupled to the power takeoff of the towing vehicle (not shown) by means of a drive shaft 83 (FIGS. 3 and 5), a pair of universal couplers 84, and a right angle drive mechanism 86.

Referring more specifically to FIGS. 6, 10 and 11, the rotor 64 includes a central hub 88 rotatable with shaft 66 and having a series of staggered rows of aligned mounts 90 rigidly secured thereto, each mount 90 serving to swingably attach to hub 88 a blade 92 pivoted at its inner end 94 to mount 90 for swinging about an axis parallel with the axis of rotation of rotor 64. Each blade 92 has an elongated impact surface 96 extending from its inner end 94 to its outermost tip end 98 for physically contacting the hay during rotation of rotor 64. A downwardly projecting, transverse flange 100 (FIG. 6) interiorly of the housing 38 throughout the length of the latter adjacent the tube 40 is disposed in close proximity to the tip ends 98 of blades 92 during rotation of rotor 64 to serve as a deflector and direct the hay into tube 40 as the hay is thrown upwardly in housing 38 by the blades 92. It is to be noted that the flange 100 should not be provided with a cutting edge of any kind but, instead, serves only to prevent the hay contacted by blades 92 from spinning about hub 88 as rotor 64 rotates.

Each of the blades 92 further has a concave air scoop 102 within surface 96 between ends 94 and 98 which acts on the crop-lifting current of air flowing upwardly into housing 38 through the open bottom thereof. Scoops 102 serve to force such air upwardly through tube 40 and into the container 34. An elongated, rectangular flat paddle 104 is provided on each blade 92 between the tip end 98 of the latter and the scoop 102, the longitudinal axis of paddle 104 extending parallel to the axis of rotation of rotor 64 and the transverse axis of paddle 104 extending substantially radially of such axis during rotation of the rotor 64. The outer longitudinal edge of paddle 104 forms tip end 98 of blade 92 while the inner longitudinal edge thereof merges with scoop 102. The scoop 102 has a flat, longitudinal axis which is parallel with the longitudinal axis of paddle 104 and an arcuate, transverse axis which extends from paddle 104 toward the inner end 94 of the blade 92.

Each blade 92 is also provided with an elongated, flat, trapezoidal vane 106 between the scoop 102 and inner end 94. Vane 106 has opposed inner and outer ends 108 and 110 respectively which are parallel to the axis of rotation of rotor 64. The scoop 102 progressively increases in width as end 110 is approached, whereby the end 110 of vane 106 merges with scoop 102, and the inner end 108 of vane 106 merges with the inner blade end 94. Further, the vane 106 is normally extended at a tangent to the axis of swinging movement of blade 92 at inner end 94 thereof, and the vane 106 recedes in a direction opposite to the direction of rotation of rotor 64 as the latter rotates, such direction being clockwise, viewing FIGS. 6 and 11.

It is to be noted that the blades 92 are arranged in four rows extending longitudinally of rotor 64 with the blades 92 of each row in alignment. The blades 92 of each row are offset from those of the remaining rows, presenting, therefore, a plurality of pairs of diametrically opposed blades 92. Thus the paddles 104 cover the entire length of rotor 64 because they are, in effect, overlapped circumferentially, i.e., the distance between the paddles 104 is less than their lengths across ends 98. Yet, there is substantial spacing between the blades from the ends 94 to the paddles 104 for adequate flow of air.

The shape of blades 92 and their arrangement on hub 88 become important from the standpoint of both dynamic and static balance, and the reduction of vibration because the percussion point and center of gravity are spaced radially outwardly from the axis of rotation of shaft 66. This substantially reduces the tendency of the blades 92 to yield about their swinging axes in mounts 90 due to impact with the crop which they pick up.

The initial lifting action on the crop is the impact of the paddles 104 on the material to raise it off the ground, upwardly into the lower inlet end of tube 40, and thence toward an upper, arcuate section 128 of tube 40 by forcible projection. Such material movement produces a flow of air into the housing 38 and into the tube 40, the scoops 102 acting, therefore, to pick up the air in the material and create a strong gale that continues through the outlet 130 (FIG. 6) of section 128 toward the rear end of container 34. Thus, even if the upward momentum of the material initiated by paddles 104 diminishes within tube 40, the air blast serves to carry the material on, through outlet 130, and toward the rear end of container 34.

Container 34 has a pair of upright corner posts 112 on each side thereof, and a series of intermediate posts 114, all of which extend upwardly from frame 30 and serve to support a single fore-and-aft extending top member 116 (FIGS. 3, 4, 14, 17 and 19). The sides of the container 34 are defined by corrugated side panels 118 which are carried by posts 112, 114 and upper member 116, while the front end of container 34 (FIG. 1) is defined by sections 120 of foraminous material supported by struts 122 which extend between opposing front corner posts 112. The top of container 34, defined by members 116 and the top strut 122, is open, as well as the rear end between corner posts 112 (FIGS. 2 and 4), although a ramp 124 pivoted at its lower end to a lug 126 on frame 30 (FIG. 14) may be swung into closing relationship to such open rear end of the container 34 (FIG. 4).

A compressor 132 disposed above container 34 and supported for vertical reciprocation by four fluid pressure, double-acting piston and cylinder units 134 pivotally secured to the frame 30 at the corners of container 34 is provided for periodically compacting within container 34 the hay which has been delivered thereto by pickup and conveying unit 36.

The compressor 132 is constructed from a plurality of fore-and-aft spaced, arcuate ribs 136 (FIGS. 5 and 17) to which are attached arcuate, corrugated panels 138 terminating at a distance from a fore-and-aft extending central tie member 140, the remaining area between the ends of panels 138 and tie member 140 being covered with foraminous sections 142. A pair of the ribs 136 each has two upright supports 144 secured thereto, one on each side respectively of compressor 132 which extend beyond the upper surface of the panels 138 to carry a horizontal crossbeam 146. Each crossbeam 146 is coupled with the upper ends of the piston rods 148 of a pair of the piston and cylinder units 134. The lower stretches of each rib 136 comprise a vertical stud 150 which is slidable within the sides of container 34, there being a single elongated, pointed shoe 152 (FIGS. 6 and 17) extending longitudinally of compressor 132 across the lowermost ends of all of the studs 150 to facilitate movement of the latter through the hay as the compressor 132 is actuated.

An elongated cross bracket 154 (FIGS. 1 and 17) extends between the studs 150 of the forwardmost rib 136, the area below cross bracket 154 being open to permit the hay from pickup and conveying unit 36 to enter container 34 when the compressor 132 is in the raised condition of either FIG. 1 or FIG. 6. Another cross bracket 154 between the rearmost studs 150 (FIG. 2) pivotally supports a free-swinging door 155 which hangs below bracket 154 between opposed studs 150. The forward bracket 154 has a number of ears 156 (FIGS. 5, 6 and 13) which extend toward the interior of compressor 132 and pivotally support an arcuate deflector 158 spanning substantially the width of container 34 above the latter for engaging the hay as it issues from section 128 of delivery tube 40 to evenly distribute the hay within the container 34. One or more chains 160 (FIG. 6) secured at one end thereof to the back of the deflector 158 and its opposite end to the forwardmost rib 136 limit the extent of downward swinging of the deflector 158, while a pair of cables 162 secured to the deflector 158 and looped through U-shaped guides 164 as seen best in FIG. 17 (or pulleys, if desired) on forward rib 136 are anchored to the top of a forward corner post 112 (FIGS. 1 and 6) to cause pivotal tilting of the deflector 158 as the latter moves with compressor 132 during vertical reciprocation of the latter.

As shown in FIG. 6, when the compressor 132 is in an intermediate position, the cable 162 is slack, while chain 160 is taut to cause deflection of the hay toward the forwardmost part of container 34. In FIG. 12, however, the compressor 132 is disposed in its fully raised position, at which time cable 162 is taut to swing deflector 158 upwardly out of an operative position such that hay is directed toward the rearmost areas of container 34. The tilting of deflector 158 about a horizontal axis permits even distribution of the hay fore-and-aft of the container 34, while a pair of curved vanes or guides 166 (FIGS. 6 and 13) projecting outwardly from the concave inner surface of deflector 158 serve to direct the hay from side-to-side of container 34, thereby eliminating the need for any lateral movement of the outlet tube 40 with respect to container 34. A cutout area 168 (FIG. 13) serves as an exhaust by allowing the airstream issuing from tube 40 to pass through deflector 158, while the hay carried primarily along the top of the airstream impinges the deflector 158, thereby eliminating a substantial amount of back pressure and dust through the foraminous front sections 120 of the container 34.

As will hereinafter appear, the deflector 158 is usually needed only for aiding in the filling of but a relatively small portion of the container 34 adjacent the forward end of the latter. The unit 36 is otherwise capable, for the most part, of filling substantially all of the container 34 while deflector 158 is retracted upwardly into the upper, forward corner of the compressor 132.

The piston and cylinder units 134 which power the compressor 132 are connected in a system illustrated by FIG. 20 which utilizes the fluid-pressurizing assembly of the towing vehicle (not shown) including a pump 170, a reservoir 172, and a valve 174 which permits cycling of fluid between the pump 170 and reservoir 172 without actuating any of the units 134. The units 134 are connected in series; accordingly, a master-slave arrangement is established and, upon flow of fluid from valve 174 first in one direction and then in the opposite direction, the piston rods 148 are reciprocated simultaneously to raise and lower the compressor 132.

Movement of the compressor 132 in this manner is very important because it assures equalized pressure on the stack of hay in the container 34 throughout the area of its upper surface and, therefore, even compression fore to aft and side to side. Such advantageous results cannot be expected with cylinders coupled in parallel or with many other types of prime movers for material compressors of this nature.

The swinging movement of the ramp 124 (FIGS. 4 and 14) into and out of its closing relationship with the open end of container 34 may be controlled by operably coupling the ramp 124 with the compressor 132. A cable 202 on each side of the container 34 is secured at one end thereof to the ramp 124 at a distance from lug 126, is entrained around a stationary sheave 204 on rear corner post 112, and is secured at its opposite end to the top member 116 of container 34. An elongated, upright compression member 206 on each side of container 34 has a sheave 208 affixed to its lower end and is inserted between the cable 202 and a pad 210 on the compressor 132 whereby to transfer movement of the compressor 132 to cable 202 and thence to the ramp 124 to effect raising and lowering of the latter during such movement of the compressor 132. The member 206 extends through an opening 212 (FIG. 18) in top member 116 and is guided during its vertical movement by a roller 214.

The compressor 132 and ramp 124 are operably coupled in a manner such that the ramp 124 is not necessarily raised or lowered each time the compressor 132 is actuated. To this end, the member 206 only abuts pad 210, and a latch 216 on each side of container 34 (FIGS. 4, 14 and 19) is provided for releasably holding the ramp 124 against the open end of container 34 as the compressor 132 moves from its completely lowered position of FIG. 4 into its totally raised position of FIG. 14.

Upon release of latches 216 by actuating cables 218, which extend (See FIG. 1) to a convenient location on the towing vehicle (not shown), while the compressor 132 is at the lower end of its path of travel, with pad 210 abutting member 206, raising of the compressor 132 causes the ramp 124 to gradually swing to the ground by gravity. However, it is clear from FIGS. 4 and 14 that the ramp 124 may also be lowered by releasing the latch 216 when compressor 132 is at its upper limit of travel. In order to eliminate lowering of the ramp 124 with excessive speed when the compressor 132 is in this position, a brake assembly 220 (FIGS. 4 and 14–16) on each side of container 34 is provided for slowing the rate of descent of the ramp 124.

Assembly 220 includes a spring-loaded brake shoe 222 which presses against member 206 and is adjustable laterally of the latter by means of an adjusting screw 224, there being a free-wheeling sheave 226 on a stationary component 228 of assembly 220 over which the cable 202 is trained. The member 206 is held against movement away from the shoe 222 by a roller 230 on component 228 and the member 206 tapers (widens) as its lower end is approached whereby to cause the shoe 222 to bear progressively harder against the surface of member 206 as the latter is forced upwardly by cable 202 acting on sheave 208 during lowering of ramp 124. Components 228 are rigidly mounted on side panels 118, whereas shoes 222 and screws 224 are carried by brackets 231 slidably mounted on components 228 for fore-and-aft movement upon adjustment of screws 224.

Push-off mechanism 232 (FIGS. 5, 6, 7 and 17) is provided at the bed of container 34 for use when the ramp 124 is lowered. Mechanism 232 includes a number of laterally extending bars 234 which traverse container 34 and are carried by a pair of endless chains 236 trained about front and rear sprockets 238 and 240 respectively. Each bar 234 has a channel 242 rigid thereto and looped over each chain 236 respectively for preventing undesirable twisting of the bars 234 as they engage the stack of hay.

The push-off mechanism 232 may be driven at selected intervals by placing the push-off drive assembly 250 (FIG. 3) into operative coupling relationship with the power takeoff of the towing vehicle. A belt 252 is loosely trained about a small, constantly rotating pulley 254 on shaft 74 and a larger pulley 256 supported by frame 30, pulley 256 in turn being coupled with the shaft of sprockets 238 (FIG. 6) through a pair of sprockets 258 and 260 and a chain 262. A spring-loaded belt tensioner 264 may be actuated by a cable 266 to tighten the belt 252, whereby to rotate pulley 256 and drive the forward sprockets 238.

The air emanating from the outlet 130 of section 128 of tube 40 generally flows rearwardly along the longitudinal, fore-and-aft axis of the container 34, strikes the door 155, and then tends to return along the two side panels 138 of compressor 132, with much of such air escaping through the front end of compressor 132. It appears as if this type of air movement creates a condition in the compressed stack wherein it ultimately settles out in an undulated upper surface. Experience has demonstrated that at times the stack has a large, longitudinal hump and a pair of side humps with a longitudinal groove or valley between each side hump and the center hump. These water collection valleys are, of course, undesirable.

Therefore, the compressor 132 may be provided with longitudinal gussets at each of its uppermost, arcuate corners, one only of which is shown in FIG. 21 and designated by the numeral 184. Gussets 184 span the inside corners of compressor 132 and are disposed at an angle transversely thereof, extending upwardly from side panels 138 to the roof of compressor 132. Thus, during compression, the uppermost longitudinal corners of the stack are given additional pressure, eliminating the aforementioned side humps. The stack takes on a loaf-like shape so that its top and sides have good water-shedding configuration.

As best seen in FIGS. 5, 6 and 12, the section 128 of tube 40 has an elongated flap 186 extending entirely thereacross above its outlet 130 which engages and wipes along the front of compressor 132 during vertical reciprocation of the latter, and during up and down movement of unit 36 relative to container 34 because of uneven terrain. Flap 186 is flexible so that it will easily flap up and down and will also yield as outlet 130 moves toward and away from compressor 132 about the four-point linkage of arms 42 and braces 63. Flap 186 assures delivery of the air and material from outlet 130 to container 34.

In operation, the pickup and conveying unit 36 is initially lowered by piston and cylinder unit 52 until roller 50 lightly engages the ground (FIG. 6), while the ramp 124 is held against the open end of container 34 by latches 216 (FIG. 4), and the compressor 132 is at its upper limit of travel (FIG. 12) with deflector 158 in its standby position. As the loader is advanced across the field and the rotor 64 is actuated by the drive assembly 70, the free swinging blades 92 rotate in the direction illustrated in FIG. 6 and extend radially outwardly from the rotor shaft 66. As the unit 36 encounters windows of pre-cut hay lying on the field, the impact surfaces 96 of the paddles 104 engage the hay to lift it from the field, while simultaneously the air scoops 102 of the blades 92 force the current of air flowing through housing 38 into the tube 40 which directs the hay toward the outlet 130. Because the compressor 132 is completely raised, the hay does not engage deflector 158 as it is blown from the discharge outlet 130, and instead, the hay travels to the rear of container 34 and initially accumulates as at 192 in the manner shown in FIG. 22.

After a sufficient amount of hay has so accumulated at the rear of container 34, the piston and cylinder units 134 may be actuated to lower compressor 132 into its intermediate position as shown in FIG. 6, whereupon the deflector 158 is allowed by the slack cable 162 to tilt downwardly until stopped by the chain 160. In this position, the deflector 158 causes hay issuing from outlet 130 to be directed toward the forward end of container 34 and layered as at 194 on top of hay accumulation 192 as illustrated in FIG. 22.

When hay has accumulated to a level above the upper members 116 of container 34, the piston and cylinder units 134 may again be actuated to draw compressor 132 against the hay. The deflector 158 swings harmlessly into the upper corner of compressor 132 as the latter continues to be drawn against the hay in container 34, and the hay is compacted into a firm stack conforming substantially in size and shape to the container 34. Depending upon the size of stack desired, compressor 132 may thereafter be returned to its upper limit of travel to repeat the accumulation and compression process.

After a stack of desired size has been formed, the loader may be moved to a selected site for unloading of the stack, while the compressor 132 remains lowered against the hay. Unloading of the stack may then proceed by initially releasing latch 216 by actuating cable 218, and then gradually raising compressor 132 through piston and cylinder units 134. Such raising of compressor 132 permits the member 206 to move upwardly with compressor 132, allowing the cable 202 to permit ramp 124 to swing slowly to the ground. Once ramp 124 has reached the ground, the push-off mechanism 232 may be operated by actuating belt tensioner 264 through cable 266 to cause bars 234 to move the stack through the open end of container 34 and down ramp 124 as upper door 155 is swung open by the moving stack. At this time it is usually desirable to move the loader forwardly as soon as the stack engages the ground at a rate synchronized with the rate of push-off to avoid pulling the stack apart during unloading. For example, most tractors move at about 2 miles per hour in low gear; the rate of travel of bars 234 should be chosen accordingly.

After unloading of the stack, ramp 124 may be quickly and easily raised by once again actuating piston and cylinder units 134 to lower compressor 132, whereby the member 206 pushes against cable 202, drawing ramp 124 toward the open end of container 34. Spring-loaded latch 216 then takes over to retain ramp 124 in position as compressor 132 is raised in preparation for another stack-forming cycle.

In the event that the ramp 124 is accidentally released while the compressor 132 is raised, the braking assembly 220 operates to insure that the ramp 124 does not swing toward the ground at an excessive rate of speed. Because of the tapered configuration of member 206, as the ramp 124 swings toward the ground, brake shoe 222 bears progressively harder and harder against the surface of member 206 to thereby progressively decelerate ramp 124 as it approaches the ground.

Having thus described the invention, what is claimed as new and desired to be secured by letters patent is:

1. In a farm implement:
   an open bottom housing having an upright outlet tube extending upwardly therefrom;
   a rotor mounted in the housing for rotation about a generally horizontal axis traversing the normal path of travel of the implement,
   said rotor being provided with a plurality of blades each swingable at the inner end thereof about an axis parallel with the axis of rotation of the rotor,
   each blade being provided with an uninterrupted, elongated, transversely flat, leading surface extending from its axis of swinging movement to its outermost tip end for physically contacting a crop lying on the ground to forcibly transfer the crop from the ground, upwardly into the housing through the open bottom thereof, and thence upwardly into said tube, there being an air scoop on each of said surfaces extending outwardly from said inner end of the blade for acting on the air flowing into the housing with said crop to produce a crop-advancing air blast directed upwardly into said tube as initiated by said impact,
   said scoop having a concave portion remote from said inner end of the blade,
   each surface including an elongated, flat impact paddle between said concave portion and said tip end of the blade,
   each paddle being rectangular and provided with a transverse axis normally radial to said axis of rotation of the rotor; and
   a container separate from the tube and shiftable relative thereto for receiving the crop from said tube,
   said container being provided with a deflector for distributing the crop evenly within the container as the crop is fed thereinto,
   said deflector being shiftably secured to the container therewithin for varying the position of the deflector relative to the flow of the crop issuing from said tube.

2. In a farm implement as claimed in claim 1, wherein said deflector is provided with means for guiding part of the crop toward one side of the container and the remainder of the crop toward the other side of the container.

3. In a farm implement, a combination crop pickup and conveying unit comprising:
   an open bottom housing having an upright outlet tube extending upwardly therefrom;
   a rotor mounted in the housing for rotation about a generally horizontal axis traversing the normal path of travel of the implement,
   said rotor being provided with a plurality of blades each swingable at the inner end thereof about an axis parallel with the axis of rotation of the rotor,
   each blade being provided with an elongated impact surface extending from its axis of swinging movement to its outermost tip end for physically contacting a crop lying on the ground to forcibly transfer the crop from the ground, upwardly into the housing through the open bottom thereof, and thence upwardly into said tube,
   there being an air scoop on each of said surfaces for acting on the air flowing into the housing with said crop to produce a crop-advancing air blast directed upwardly into said tube;
   a container for receiving the crop from said tube, said container being provided with a deflector for distributing the crop evenly within the container as the crop is fed thereinto,
   said deflector being shiftable for varying the position of the deflector relative to the flow of the crop issuing from said tube,
   said container being provided with a movable compressor for periodically compacting the crop within the container to form a stack conforming in shape with the container,
   said deflector being mounted on the compressor for movement therewith; and
   structure including an anchor and means interconnecting the anchor and said deflector for shifting the deflector relative to the compressor as the latter is moved.

4. In a farm implement as claimed in claim 3, wherein said container has an open end and means is provided within the container for moving the stack toward said open end, and wherein is provided a ramp on the container at said open end swingable into and out of closing relationship to said open end, there being means operably coupling the compressor with the ramp for controlling the swinging of the ramp in response to movement of the compressor.

* * * * *